United States Patent [19]

Boden

[11] 4,156,574
[45] May 29, 1979

[54] CORD LOCK WITH SELF LOCKING SPRING FEELERS

[76] Inventor: Ogden W. Boden, 1580 Gaywood Dr., Altadena, Calif. 91101

[21] Appl. No.: 875,697

[22] Filed: Feb. 6, 1978

[51] Int. Cl.² ............................................. F16B 2/14
[52] U.S. Cl. .................................. 403/211; 403/374; 24/136 K; 24/115 M
[58] Field of Search ............... 403/211, 209, 215, 374; 24/115 M, 136 R, 136 K; D8/382, 383; D2/405, 409, 448; 128/327; 339/247

[56] References Cited
U.S. PATENT DOCUMENTS

| D. 227,075 | 6/1973 | Salt | D8/382 |
|---|---|---|---|
| 1,520,716 | 12/1924 | Judd | 24/136 R |
| 3,758,922 | 9/1973 | Field | 24/115 M |

Primary Examiner—Wayne L. Shedd
Attorney, Agent, or Firm—William P. Green

[57] ABSTRACT

A cord lock including a body containing a passage within which there is received a locking slide adapted to wedge a pair of cords against opposite side walls of the passage, with the slide having a main locking portion with a pair of toothed faces engageable with the cords respectively, and resiliently flexible feeler arms projecting from the slide and engageable with the cords in both the locked and released positions of the slide to attain a self locking action automatically actuating the slide to its locking position upon predetermined movement of the cords, and retaining the slide in locked position until purposely released therefrom. The side walls of the passage and the body desirably have converging portions laterally opposite and coacting with the main locking portion of the slide, and non-converging portions laterally opposite and coacting with the resilient feeler arms.

15 Claims, 6 Drawing Figures

CORD LOCK WITH SELF LOCKING SPRING FEELERS

BACKGROUND OF THE INVENTION

This invention relates to devices for locking cords against longitudinal movement, as for instance in releasably retaining the drawstring of a garment, bag, or the like in a tightened condition.

In several prior art patents, including for example U.S. Pat. Nos. 3,132,390; 3,845,575; 3,861,003; and 3,965,544, I have shown cord locking devices of a type in which two cords extend through a passage in a body of the device, and are adapted to be releasably locked against longitudinal movement in a predetermined direction by a movable slide element positioned within the body. The two cords extend along opposite sides of the locking slide, and are wedged tightly against tapering side walls of the body passage by the slide. In the first three of these patents, the slide has generally oppositely directed toothed faces which engage the two cords and which are carried on the slide in essentially fixed relative positions. In the fourth listed prior patent, two oppositely facing toothed faces for engaging the cords respectively are carried on a pair of spring fingers which urge the teeth of those faces laterally against the cords in all positions of the slide, to attain an automatic self locking action.

SUMMARY OF THE INVENTION

The present invention provides an improved cord lock of the above discussed general type, and in particular one having a self locking characteristic similar to that attained in my U.S. Pat. No. 3,965,544, but with a capacity for more effectively taking high load forces exerted by the locked cords. In addition, the self locking characteristic itself is improved, and functions both to automatically actuate the slide from a released position to a locking position when the cords are pulled in a predetermined direction, and then retain the slide in that position and against returning movement unless and until it is forcibly retracted from the locked setting.

To achieve these results, the present invention utilizes a unique locking slide having a first main portion which takes the primary load exerted by the cords in use, and a resiliently flexible arm or arms (preferably two such arms) acting to engage the cords in a self locking relation but without the necessity for these arms to take the primary load forces in use. These arms act as feelers which exert laterally outward force against the cords in both the active locking position of the slide and its released position, so that regardless of the setting of the slide the feelers will cause actuation of the slide to its locking position whenever the cords are pulled in a predetermined longitudinal direction. After the slide is actuated to its locking position, the continued engagement of the spring fingers with the cords acts to prevent unwanted retracting movement of the slide and maintain it in locking position even after the load forces have been relieved. The main load taking portion of the slide has oppositely directed toothed faces for engaging the two cords, with those faces being essentially fixed against movement laterally inwardly toward one another, to thereby take the desired high load forces.

The opposite side walls of the body passage within which the cords and slide are received desirably have converging portions laterally opposite the mentioned toothed gripping faces of the main locking portion of the slide, and for best results have non-converging portions laterally opposite the resilient feeler arms. By virtue of the non-converging relationship of these portions of the side wall surfaces against which the spring fingers urge the cords, there is no camming effect tending to wedge or cam the slide element axially outwardly from its locking position to its released position as a result of the spring force of the feeler arms.

BRIEF DESCRIPTION OF THE DRAWING

The above and other features and objects of the invention will be better understood from the following detailed description of the typical embodiment illustrated in the accompanying drawing, in which.

DESCRIPTION OF THE PREFERRED EMBODIMENT

Figure 1:
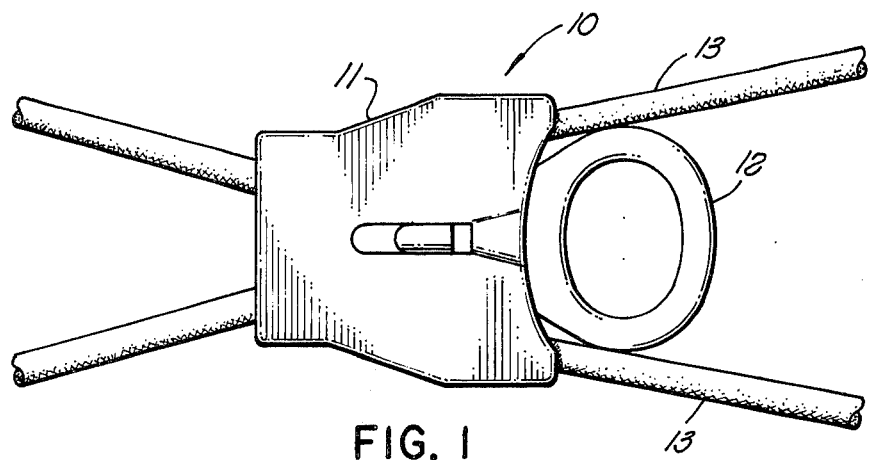
FIG. 1 is a front elevational view of a cord lock constructed in accordance with the invention.
Figure 2:
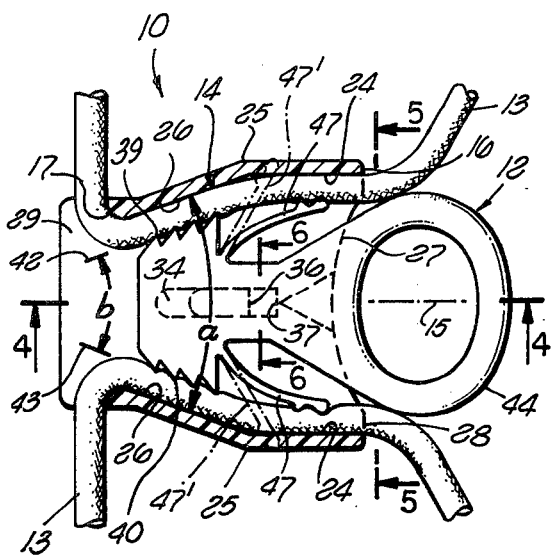
FIG. 2 is a central section through the FIG. 1 cord lock, showing the slide in its locking position.

The cord locking device 10 illustrated in the figures includes a body part 11 and a relatively movable locking slide part 12 which acts to releasably retain a pair of cords 13 against leftward movement through the body as viewed in FIGS. 1 and 2. It will of course be understood that the two cords 13 may in fact be opposite ends of a single drawstring or other cord, which is to be tightened or reduced in effective length by pulling the cords or cord ends rightwardly in FIG. 1 relative to the body 11 of the device. Where the specification and claims of this application for simplicity of description refer to two cords, this terminology is intended to cover an arrangement in which the two cords thus referred to are portions of a single cord, as discussed.

The outer body 11 of the device contains a passage 14 centered about an axis 15 of the device and within which the cords and the locking slide 12 are movably received. The passage 14 has a first open end 16 at the right end of the device as viewed in FIGS. 1 and 2, and a second and smaller open end 17 at the left end in FIGS. 1 and 2.

Figure 5:
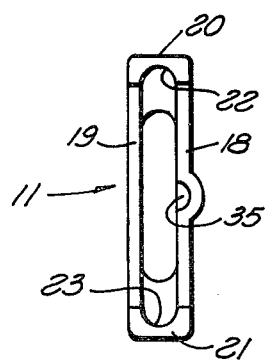
FIG. 5 is an end view of the outer body of the device taken on line 5—5 of FIG. 2, but with the locking slide removed.

To define the passage 14, the body has two essentially planar parallel walls 18 and 19 (FIG. 5), and two opposite side walls 20 and 21. The side walls 20 and 21 have inner surfaces 22 and 23 facing toward one another and defining opposite sides of passage 14, and along which the two cords 13 extend in passing through the body. Surfaces 22 and 23 desirably have the semi-circular cross sectional configuration illustrated in FIG. 5, in planes disposed transversely of main axis 15 of the device, with this semi-circular cross section continuing throughout the entire axial length of the passage 14 between its opposite ends 16 and 17. In advancing leftwardly from the larger open end 16 of the body, inner surfaces 22 and 23 have first portions 24 which extend directly axially, that is, directly parallel to axis 15, to a location 25, and then have second portions 26 which converge progressively toward one another at an angle a from the locations 25 to the smaller open end 17 of the body. The surface portions 24 thus neither converge nor diverge as they advance axially. The angle a of convergence of the surface portions 26 may typically be between about 30° and 50°, preferably about 40°.

At the larger end of the body, the two parallel walls 18 and 19 may be arcuately and similarly recessed axially inwardly at 27, inwardly beyond the transverse plane 28 in which side walls 20 and 21 terminate. At the opposite or smaller end of the body, the two parallel walls 18 and 19 may have portions 29 projecting somewhat beyond the extremities 17 of the side walls, to form side notches or recesses through which the cords 13 may extend laterally as illustrated in FIG. 2.

Figure 6:
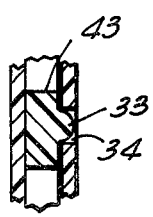
FIG. 6 is a fragmentary transverse section taken on line 6—6 of FIG. 2.

Locking slide 12 is dimensioned to fit closely but slidably between the two parallel walls 18 and 19 of the body. More specifically, the slide has two parallel planar surfaces 31 and 32 which are spaced apart a thickness dimensioned t just slightly less than the spacing between the inner surfaces of body walls 18 and 19, for sliding confinement of the part 12 between those surfaces. A lug 33 projects from surface 32 into a guide slot 34 formed in wall 18 of the body, and is shaped to guide slide 12 for only the desired axial sliding movement along axis 15 of the device relative to body 11. To facilitate initial assembly of the parts, lug 33 may have an inclined camming face 33', typically of the rounded cross sectional configuration illustrated in FIG. 6, and adapted to engage a similarly inclined and transversely rounded groove 35 formed in the inner surface of wall 18, so that as the slide element is forced leftwardly relative to body 11, lug 33 acts by a camming effect on surface 35 to force wall 18 away from wall 19 locally at the point of contact of the lug with wall 18, and against the resilience of the material of body 11 and its wall 18, so that the lug can move into the slot 34. After the lug has reached the location of slot 34, the portion of wall 18 carrying the camming surface 35 returns to its initial position relative to the opposite wall 19, and thereafter the shoulder 36 on lug 33 is engageable with end shoulder 37 of slot 34 to prevent reverse withdrawal of the slide from the body.

The body 11 and slide 12 are preferably both molded of an appropriate resinous plastic material, such as polyoxymethylene ("Delrin"), giving both of these parts sufficient resilient deformability to permit them to serve their desired purposes satisfactorily. The body 11 retains its illustrated shape essentially rigidly except when the slide is being forced into the body as just discussed.

Describing now the configuration of the slide 12 as viewed in FIG. 2, the slide may be considered as having a first main locking portion 38, having two toothed opposite side faces 39 and 40 located within and laterally opposite the two converging inner surfaces 26 of body 11. Desirably, each of the toothed faces 39 has a number of teeth 41, which may be shaped as shown in FIG. 2, and whose peaks or outer edges preferably lie in a common plane 42 or 43. These planes 42 and 43 converge toward one another at an angle b, which is preferably the same as the angle a of convergence of the side wall surfaces 26. Thus, planes 42 and 43 lie parallel to surfaces 26, and the various teeth of the two faces 40 and 41 tend to bite into the two cords 13 equally as the slide 12 moves leftwardly in FIGS. 1 and 2, and as the teeth move closer to surfaces 26. The toothed faces 40 and 41 of portion 38 are retained in essentially fixed positions relative to one another, with the portion 38 desirably being solid and essentially rigid and non-deformable between those faces to take relatively heavy clamping load forces without substantial deformation when the slide tightly grips the cords.

Extending rightwardly from its main gripping portion 38, the slide has a reduced width neck 43, to which there is connected a handle portion 44 forming a handle loop accessible at the outside of the body. A user can insert a finger through this loop and pull on the slide element (rightwardly in FIGS. 1 and 2), to move the slide from the locking position of FIG. 2 to the released position of FIG. 3.

Extending outwardly from the juncture of main locking portion 38 and reduced neck 43, the slide carries and forms two similar laterally projecting feeler arms 47, which may be of relatively small cross section to give these feelers considerable longitudinal flexibility. At their free ends, the arms 47 have toothed portions 48, each desirably having two teeth as shown which are engageable laterally outwardly against the inner sides of the two cords 13. Arms 47 are resilient, and normally tend by their resilience to return to the broken line positions illustrated at 47' in FIG. 2. When the slide is contained within body 11 these arms 47 of course cannot return fully to those broken line positions, and are forcibly deflected radially inwardly against their resilience to positions such as those shown in full lines in FIG. 2. In those positions, the toothed portions 48 of the arms exert sufficient resilient force against the inner sides of the cords, in a direction away from axis 15, to cause the teeth on arms 47 to bite slightly into the material of the cords. This engagement between the teeth of arms 47 and the cords is not sufficient to prevent longitudinal movement of the cords in either direction, but is great enough to cause the cords by longitudinal movement to displace the slide axially, as between the released position of FIG. 3 and the active gripping position of FIG. 2. As will be apparent, the spring fingers 47 engage and act outwardly against the cords in both of these positions, and in all other positions to which the slide can be moved. The cross sections of all other portions of slide 12, other than the thin spring arms 27, are great enough to give those other portions essential rigidity, and maintain them against any substantial deformation from the illustrated shape during handling and operation of the device.

Figure 3:
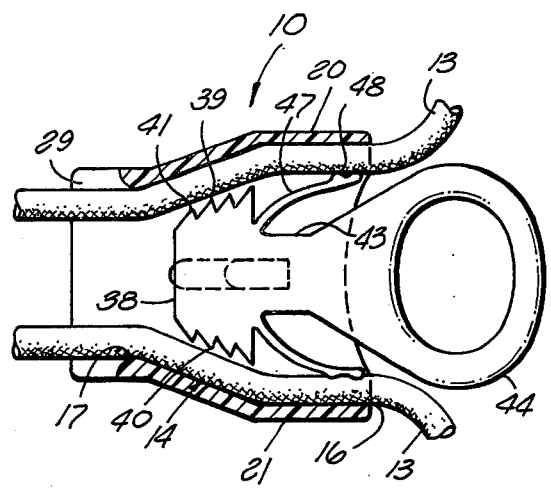
FIG. 3 is a view similar to FIG. 2, but showing the slide in its released or non-locking position.
Figure 4:
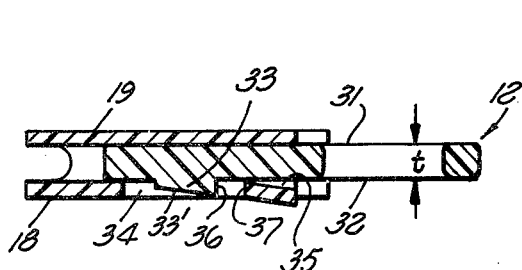
FIG. 4 is an axial section taken on line 4—4 of FIG. 2.

In describing the use of the cord locking device 10, assume that the slide and cords are initially in the released or unlocked condition of FIG. 3. In that condition, the two cords or cord ends 13 may be pulled rightwardly through the body 12 of the device and along opposite sides of the slide 12 until the cords to the left of the body reach a desired taut or tensioned condition. If the cords are then released, the tension exerted on them by the load forces will tend to pull the cords through body 11 in a leftward direction as viewed in FIG. 2. The light yielding force exerted by arms 44 against the cords will cause the cords to move the slide 12 leftwardly with them, and to the locked or gripping position of FIG. 2. That is, the toothed faces 40 and 41 on portion 38 of the slide move from the FIG. 3 position in which they are spaced sufficiently far from body surfaces 26 to allow free longitudinal movement of the cords in either direction to the FIG. 2 position in which the teeth of surfaces 40 and 41 bite into the cords and clamp them tightly against surfaces 26 in a wedging relation preventing further leftward movement of the cords. Thereafter, the greater the force exerted leftwardly on the cords, the tighter will be the gripping action, and that gripping action will be capable of taking great load forces because of the fixed relative positions of the toothed surfaces and the manner in which those surfaces are backed up against movement toward one another by provision of the solid material of portion 38 between the toothed surfaces. If the load forces on the cord are released momentarily or permanently, the engagement of the outer portions 48 of spring arms 47 against the inner sides of the cords will prevent unwanted rightward movement of the slide, and thus hold the slide in its locked position. In this connection, the fact that the portions 24 of the inner side wall surfaces 22 and 23 of the body do not converge or diverge, but rather extend parallel to axis 15 of the device, prevents the attainment of any camming action between these surfaces and spring arms 47, which action might otherwise tend to cam slide 12 to its released position under the yielding influence of arms 47. The fact that toothed surfaces 40 and 41 are opposite converging portions of the body side wall surfaces while the portions 48 of spring arms 47 are opposite non-converging portions of those side wall surfaces thus attains a highly effective overall result of maximizing the load forces which can be attained while providing for an automatic self locking action of the device, and at the same time preventing any tendency for the yielding force of spring arms 47 to cam the slide to its released position under no load conditions.

When it is desired to release the locking effect on cords 13, a user merely exerts pulling force on handle loop portion 44 of the slide relative to body 11, to pull the slide back to its FIG. 3 released position in which the cords can be moved freely in either direction to any desired setting.

While a certain specific embodiment of the present invention has been disclosed as typical, the invention is of course not limited to this particular form, but rather is applicable broadly to all such variations as fall within the scope of the appended claims.

I claim:

1. A cord lock comprising:
a body containing a passage having two opposite side walls forming a locking restriction;
a slide to be located at least partially within said passage and defining with said body two paths at opposite sides of the slide along which two cords can extend through the passage;
said slide being movable relative to the body between a cord locking position and a released position;
said slide having a main locking portion with two toothed faces at opposite sides thereof facing said two side walls respectively and adapted to clamp said cords against said side walls upon movement of the slide to said cord locking position;
said two toothed faces being essentially fixed against movement laterally inwardly toward one another;
said slide having two resiliently flexible self locking feeler arms with deflectable portions positioned to engage said cords respectively and exert yielding force laterally outwardly in generally opposite directions against the cords in both the locking and released positions of the slide.

2. A cord lock as recited in claim 1, in which said deflectable portions of said two feeler arms have teeth engageable with said cords.

3. A cord lock as recited in claim 1, in which said slide has a handle portion projecting to the outside of said body and accessible for manually actuating said slide between locking and released positions.

4. A cord lock as recited in claim 1, in which said slide has a handle portion projecting to the outside of said body and defining a finger loop by which a user may exert pulling force for actuating the slide between its locking and released positions.

5. A cord lock as recited in claim 1, in which said slide has a handle portion accessible from the outside of the body for manually actuating the slide between locking and released positions, said feeler arms projecting from the slide at a location between said main locking portion and said handle portion thereof.

6. A cord lock as recited in claim 1, in which said main locking portion is solid between said two toothed faces to take substantial load forces exerted inwardly by the cords against those faces.

7. A cord lock as recited in claim 1, in which said main locking portion of said slide forms an enlargement on the slide carrying said two toothed faces at opposite sides thereof, there being a neck of reduced transverse section projecting from said enlargement and carrying a handle accessible for manual actuation from the outside of the body to move the slide relative to said body, said feeler arms being connected to said enlargement and said reduced neck at essentially the juncture of the enlargement and reduced neck.

8. A cord lock as recited in claim 1, in which said two opposite side walls of said passage in the body have portions which are laterally opposite said two toothed faces of the slide and which converge toward one another as they advance in the direction in which said slide moves toward locking position.

9. A cord lock as recited in claim 1, in which each of said two toothed faces has a plurlity of teeth, and the two toothed faces converge essentially toward one another as they advance in the direction of movement of the slide toward locking position.

10. A cord lock as recited in claim 1, in which said side walls of said passage in the body have portions laterally opposite said two toothed faces which converge toward one another as they advance in the direction in which the slide moves to locking position, and have portions laterally opposite said deflectable cord engaging portions of the feeler arms which do not converge as they advance in said direction of movement of the slide to locking position.

11. A cord lock as recited in claim 1, in which said side walls of said passage in the body have portions laterally opposite said two toothed faces which converge toward one another as they advance in the direction in which the slide moves to locking position, and have portions laterally opposite said deflectable cord engaging portions of the feeler arms which extend essentially parallel to the direction of movement of the slide to locking position.

12. A cord lock as recited in claim 1, in which said main locking portion of the slide is an enlargement thereof having said two toothed faces at opposite sides of the enlargement, and with the enlargement being solid between said two toothed faces to take substantial load forces exerted by the cords, each of said toothed faces including a plurality of teeth, said two toothed faces converging progressively toward one another as they advance in the direction in which the slide moves toward its locking position, said slide having a reduced width neck projecting from said enlargement, and having an enlargement handle portion beyond said neck positioned for access at the outside of the body to actuate the slide between locking and released positions, said feeler arms projecting from approximately the juncture of said enlargement and said reduced neck and tending to return by their own resilience to positions in which they flare rapidly away from one another as they advance in the direction of said handle portion of the slide, said deflectable core engaging portions of the arms having teeth engageable with the cords and spring pressed laterally outwardly thereagainst, said side walls of the passage in said body having first portions which are laterally opposite said toothed faces of the main locking portion of the slide and which converge progressively toward one another in essential correspondence with the convergence of said toothed faces of the slide, and having second portions laterally opposite said teeth of the feeler arms which extend essentially parallel to the direction of movement of the slide.

13. A cord lock comprising:
   a body containing a passage having two opposite side walls forming a locking restriction;
   a slide to be located at least partially within said passage and defining with said body two paths at opposite sides of the slide along which two cords can extend through the passage;
   said slide being movable relative to the body between a cord locking position and a released position;
   said slide having a main locking portion with two toothed faces at opposite sides thereof facing said two side walls respectivley and adapted to clamp said cords against said side walls upon movement of the slide to said cord locking position;
   said slide having two resiliently flexible self locking feeler arms with deflectable portions positioned to engage said cords respectively and exert yielding force laterally outwardly in generally opposite directions against the cords in both the locking and released positions of the slide;
   said two side walls of said passage in the body having first portions which are laterally opposite said toothed faces of the main locking portion of the slide and which converge toward one another as they advance in the direction of movement of the slide between its released and cord locking positions, and having second portions which are laterally opposite said deflectable cord engaging portions of the feeler arms and which do not converge toward one another in said direction of slide movement.

14. A cord lock as recited in claim 13, in which said second portions of said side walls extend substantially parallel to said direction of slide movement.

15. A cord lock comprising:
   a body containing a passage having two opposite side walls forming a locking restriction;
   a slide to be located at least partially within said passage and defining with said body two paths at opposite sides of the slide along which two cords can extend through the passage;
   said slide being movable relative to the body between a cord locking position and a released position;
   said slide having a main locking portion with two toothed faces at opposite sides thereof facing said two side walls respectively and adapted to clamp said cords against said side walls upon movement of the slide to said cord locking position;
   said two toothed faces being essentially fixed against movement laterally inwardly toward one another;
   said slide having at least one resiliently flexible self locking feeler arm with a deflectable portion positioned to engage one of said cords and exert yielding force laterally outwardly thereagainst in both the locking and released positions of the slide.

* * * * *